(12) United States Patent
Panetti et al.

(10) Patent No.: US 11,827,384 B2
(45) Date of Patent: Nov. 28, 2023

(54) EFFICIENT SATELLITE STRUCTURE CONCEPT FOR SINGLE OR STACKING MULTIPLE LAUNCHES

(71) Applicant: THE EUROPEAN UNION, REPRESENTED BY THE EUROPEAN COMMISSION, Brussels (BE)

(72) Inventors: Aniceto Panetti, Rome (IT); Paolo Galassi, Rome (IT); Giuseppe Landella, Rome (IT); Vincenzo Carofano, Rome (IT)

(73) Assignee: THE EUROPEAN UNION, REPRESENTED BY THE EUROPEAN COMMISSION, Brussels (BE)

( * ) Notice: Subject to any disclaimer, the term of this patent is extended or adjusted under 35 U.S.C. 154(b) by 3 days.

(21) Appl. No.: 17/053,724

(22) PCT Filed: May 3, 2019

(86) PCT No.: PCT/EP2019/061440
§ 371 (c)(1),
(2) Date: Nov. 6, 2020

(87) PCT Pub. No.: WO2019/223984
PCT Pub. Date: Nov. 28, 2019

(65) Prior Publication Data
US 2021/0221540 A1 Jul. 22, 2021

(30) Foreign Application Priority Data
May 24, 2018 (EP) .................................... 18425039

(51) Int. Cl.
*B64G 1/64* (2006.01)
*B64G 1/10* (2006.01)

(52) U.S. Cl.
CPC ........... *B64G 1/641* (2013.01); *B64G 1/1085* (2013.01); *B64G 2001/643* (2013.01)

(58) Field of Classification Search
CPC .... B64G 1/10; B64G 2001/1092; B64G 1/64; B64G 1/641; B64G 1/643; B64G 1/1085
See application file for complete search history.

(56) References Cited

U.S. PATENT DOCUMENTS

| 5,344,104 A | 9/1994 | Homer et al. |
| 5,522,569 A | 6/1996 | Steffy et al. |

(Continued)

FOREIGN PATENT DOCUMENTS

| EP | 1008516 A1 | 6/2000 |
| JP | 2018-30556 A | 3/2018 |

(Continued)

OTHER PUBLICATIONS

International Search Report dated Jul. 18, 2019, issued in corresponding International Application No. PCT/EP2019/061440, filed May 3, 2019, 4 pages.

(Continued)

*Primary Examiner* — Medhat Badawi
*Assistant Examiner* — Vicente Rodriguez
(74) *Attorney, Agent, or Firm* — CHRISTENSEN O'CONNOR JOHNSON KINDNESS PLLC

(57) ABSTRACT

A system includes a satellite structure and a dedicated Payload Attaching Fitting PAF for releasable attachment to said satellite structure. The satellite structure an external load-carrying structure; and external vertical planar panels. The external vertical planar panels have internal reinforcements or embedded structures or skin thickness reinforcements, each configured for exerting the structural reinforcement function of diagonal beams in a truss structure architecture.

5 Claims, 9 Drawing Sheets

Figure 1:
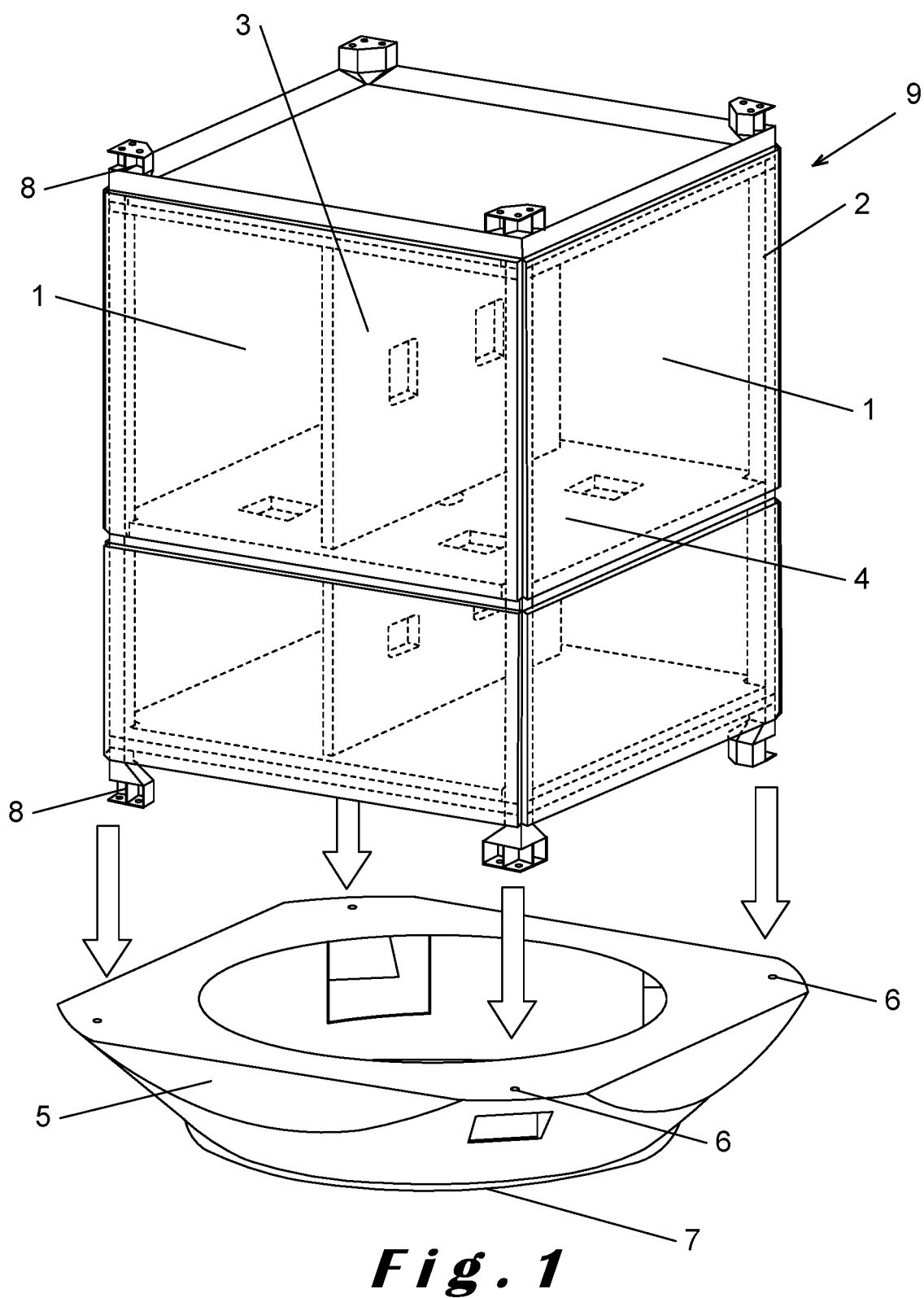

Satellite structure concept and Payload Attaching Fitting (PAF)

(56) References Cited

U.S. PATENT DOCUMENTS

| | | | |
|---|---|---|---|
| 5,529,264 A * | 6/1996 | Bedegrew | B64G 1/641 |
| | | | 102/378 |
| 5,803,402 A | 9/1998 | Krumweide et al. | |
| 6,276,639 B1 | 8/2001 | Hornung et al. | |
| 8,915,472 B2 | 12/2014 | Aston et al. | |
| 9,669,948 B2 | 6/2017 | Vichnin et al. | |
| 9,718,566 B2 * | 8/2017 | Field | B64G 1/641 |
| 10,017,279 B2 * | 7/2018 | Poncet | B64G 1/641 |
| 10,370,124 B2 * | 8/2019 | Dube | B64G 1/002 |
| 10,538,348 B2 * | 1/2020 | Riskas | B64G 1/10 |
| 2011/0296675 A1 * | 12/2011 | Roopnarine | B64G 1/10 |
| | | | 29/700 |
| 2013/0099059 A1 | 4/2013 | Cheynet De Beaupre | |
| 2015/0151855 A1 | 6/2015 | Richards et al. | |
| 2016/0311562 A1 * | 10/2016 | Apland | B64G 1/645 |
| 2016/0318635 A1 | 11/2016 | Field et al. | |
| 2017/0096240 A1 | 4/2017 | Cook et al. | |
| 2017/0327253 A1 * | 11/2017 | Bogdanov | B64G 1/645 |
| 2018/0111707 A1 | 4/2018 | Poncet et al. | |
| 2018/0265227 A1 * | 9/2018 | Cheynet De Beaupre | |
| | | | B64G 1/286 |

FOREIGN PATENT DOCUMENTS

| | | | |
|---|---|---|---|
| RU | 2 166 588 C1 | 5/2001 | |
| RU | 29 126 U1 | 4/2003 | |
| RU | 2 577 157 C2 | 3/2016 | |

OTHER PUBLICATIONS

Written Opinion of the International Searching Authority dated Jul. 18, 2019, issued in corresponding International Application No. PCT/EP2019/061440, filed May 3, 2019, 6 pages.

Hatari90; "Space Google for the planet?"; located at https://habr.com/ru/users/hatari90/comments/page10/; found on the Internet Oct. 8, 2021; printed on Nov. 16, 2021; pp. 1-7.

Search Report from the Patent Office of the Russian Federation dated Oct. 18, 2021, issued in corresponding Russian Application No. 2020136408, filed May 3, 2019, 2 pages.

International Preliminary Report on Patentability completed Sep. 4, 2020, issued in corresponding International Application No. PCT/EP2019/061440, filed May 3, 2019, 12 pages.

Japanese Office Action dated Apr. 19, 2022, issued in corresponding Japanese Patent Application No. 2020-562203, filed May 3, 2019, 9 pages.

Brazilian Office Action dated Aug. 4, 2022, issued in corresponding Brazilian Application No. 112020022592-4, filed May 3, 2019, 7 pages.

Canadian Examination Report dated Oct. 13, 2022, issued in corresponding Canadian Patent Application No. 3,099,349, filed May 3, 2019, 4 pages.

Chinese Office Action dated Aug. 5, 2023, issued in corresponding Chinese Patent Application No. 201980030449.3, filed May 3, 2019, 12 pages.

* cited by examiner

Satellite structure concept and Payload Attaching Fitting (PAF).

Four satellites on a PAF with a side-by-side and stacking architecture.

Stacking of three satellites on a PAF with a single-tower architecure.

Releasable cup-cone interface, with multiple releasable bols, between two adjacent satellites or between the lower satellite and the PAF (with any architecture).

Variable number of electro-actuated separation devices that can be installed between adjacent satellites or between the lower satellite and the PAF (with any architesture).

Releasable electrical connector and spring driven pushers (concept).

Virtual truss structure architecture concept.

Stacking of two satellites on a PAF (with single-tower architecture).

Stacking of two satellites on a PAF (with side-by-side architecture).

Releasable interface between a generic satellite (with variable cross-section dimensions) and the same PAF.

Lower part of the separation system mounted on a frame that can be mounted and dismounted by means of a bolted interface on a PAF or on the lower satellite of the stack.

EFFICIENT SATELLITE STRUCTURE CONCEPT FOR SINGLE OR STACKING MULTIPLE LAUNCHES

TECHNICAL FIELD OF THE INVENTION

The present invention relates, in general, to the technical sector of systems for deploying spacecraft's/satellites in orbit from launch vehicles and, more particularly, to an efficient satellite structure concept and its dedicated launcher interface, suitable for a single launch, or a stacking multiple launch, from a single launch vehicle.

STATE OF THE ART

As is known, launch vehicles (also simply known as launchers) are used to deploy spacecraft's/satellites in a predetermined orbit around the Earth. To this end, one or more systems for deploying one or more spacecraft and/or one or more satellites are typically used, each of which is generally configured to:
  during launch, securely and strongly hold down one or more spacecraft and/or one or more satellites stowed in an available volume of a launcher; and,
  when the launcher reaches a predefined position in orbit, deploy (i.e., release) the spacecraft/satellite(s) in response to a control signal.

Some known solutions related to this sector are provided in U.S. Pat. No. 8,915,472 B2, U.S. Pat. No. 9,669,948 B2, US 2016/0318635 A1, U.S. Pat. No. 5,522,569 A, EP 1 008 516 A1, US 2013/0099059 A1 and US 2015/0151855 A1.

In particular, U.S. Pat. No. 8,915,472 B2 concerns a multiple space vehicle launch system and discloses a launch system composed of two satellites: a lower one and an upper one. The lower one is releasably attached to the upper stage of the launch vehicle by means of a standard ring interface and again releasably attached to the upper satellite by means of the same type of standard ring interface. The lower satellite bears the launch loads induced by the upper satellite, thereby eliminating the need for additional support structures (e.g., a dispenser). Both satellites include a central core structure bearing the main portion of the launch loads that is connected to the ring interfaces.

U.S. Pat. No. 9,669,948 B2 relates to a side-by-side dual-launch spacecraft arrangement and discloses a launch system composed of two satellites placed side-by-side on a dual-launch adaptor. Both satellites are releasably attached to the dual-launch adaptor by means of a standard ring interface. The dual-launch adaptor is mounted on the last stage of the launch vehicle by means of a standard ring interface. Both satellites include a central core structure bearing the main portion of the launch loads connected to the ring interface.

DESCRIPTION OF THE INVENTION

1. Brief Description of the Drawings

Figure 3:
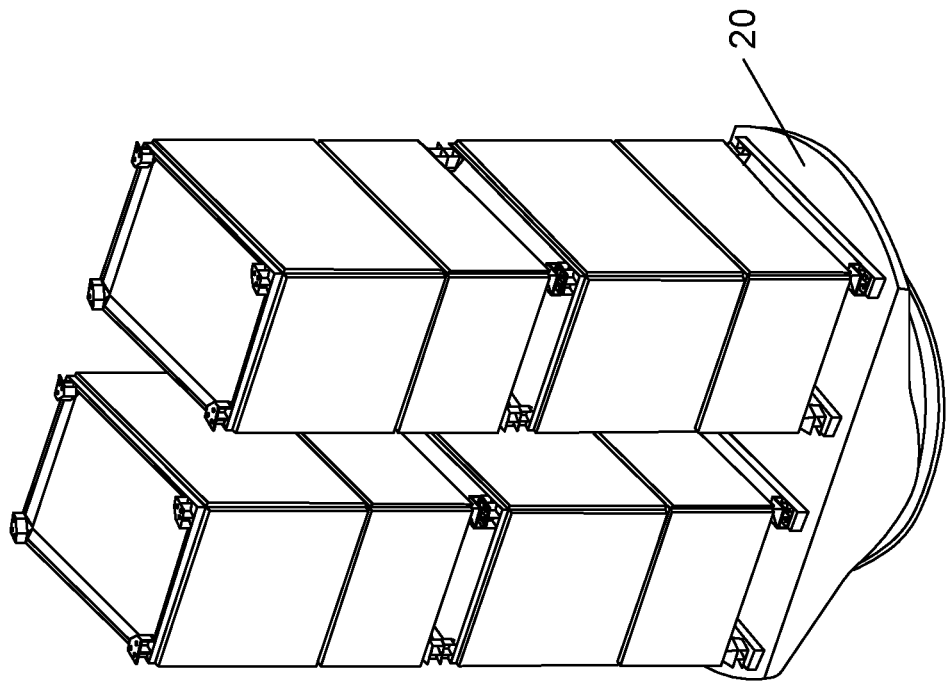
Figure 2:
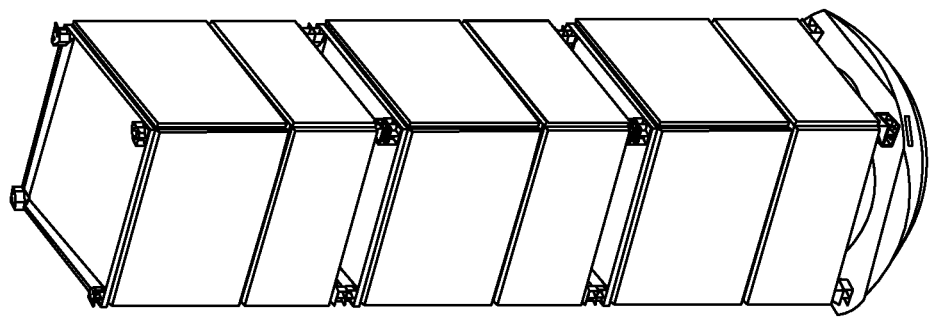
Figure 4:
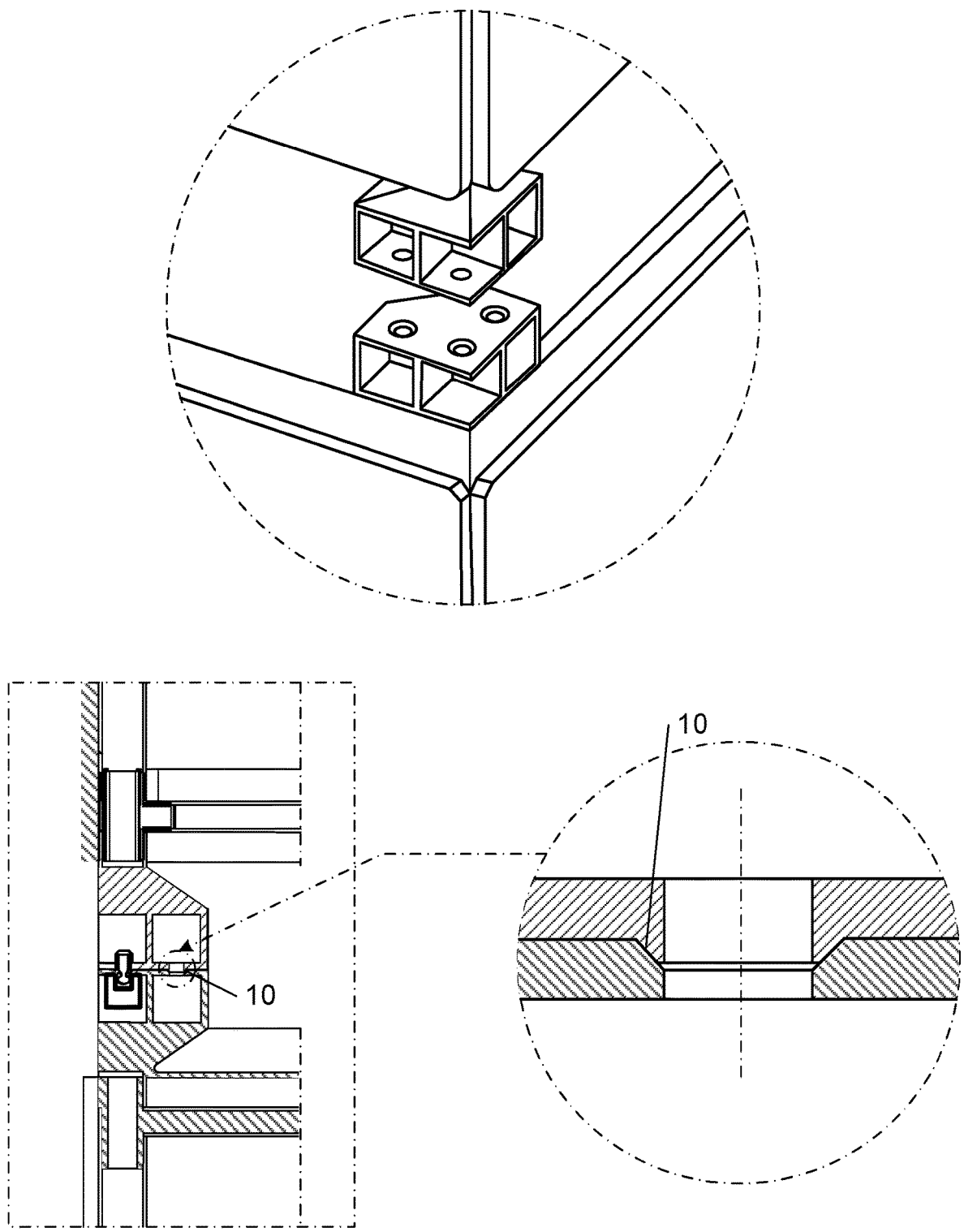
Figure 5:
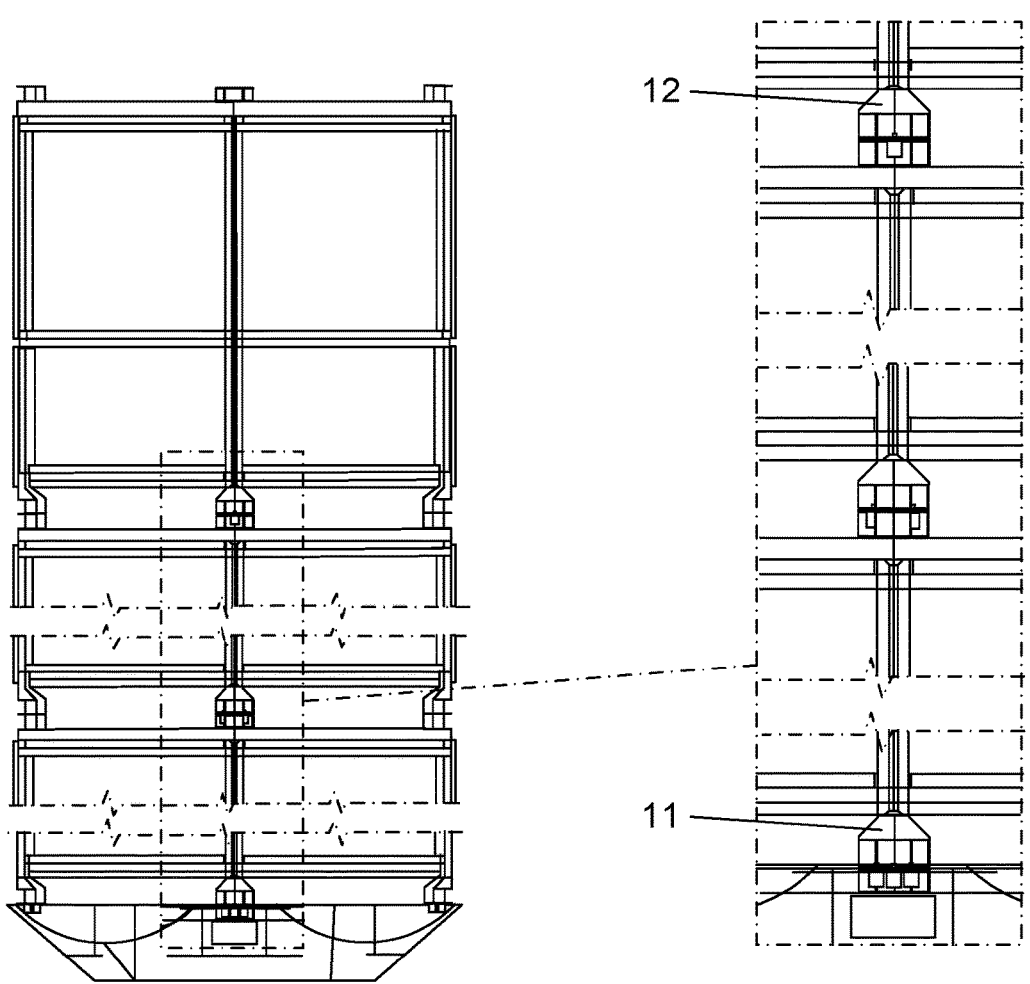
Figure 6:
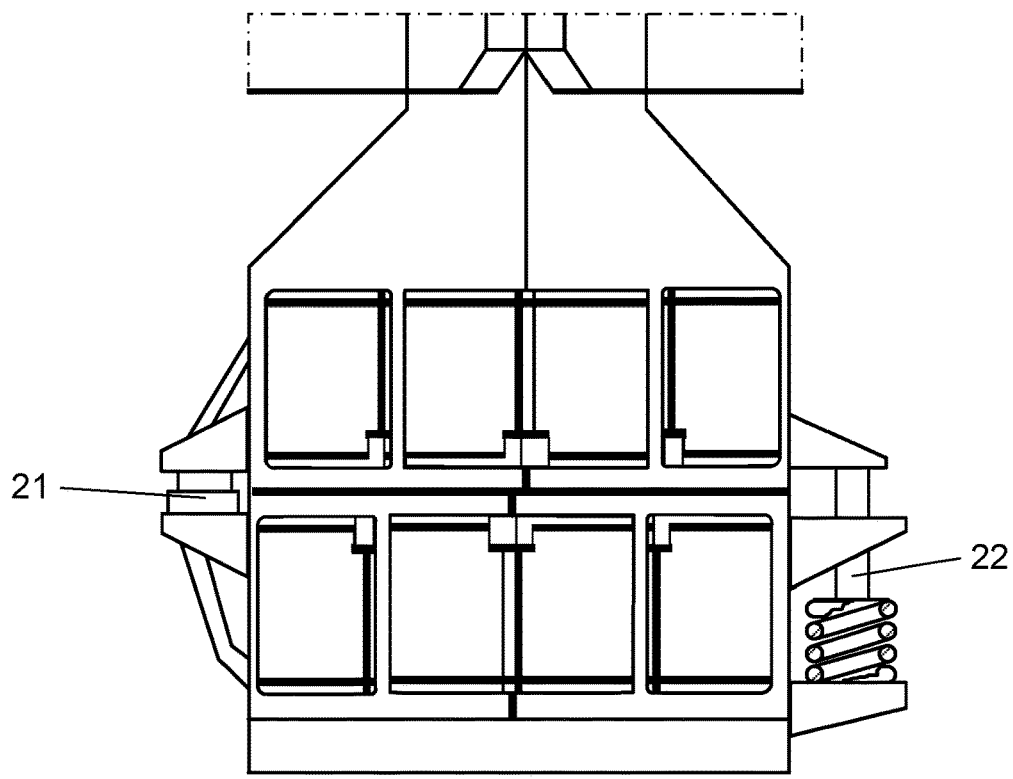
Figure 7:
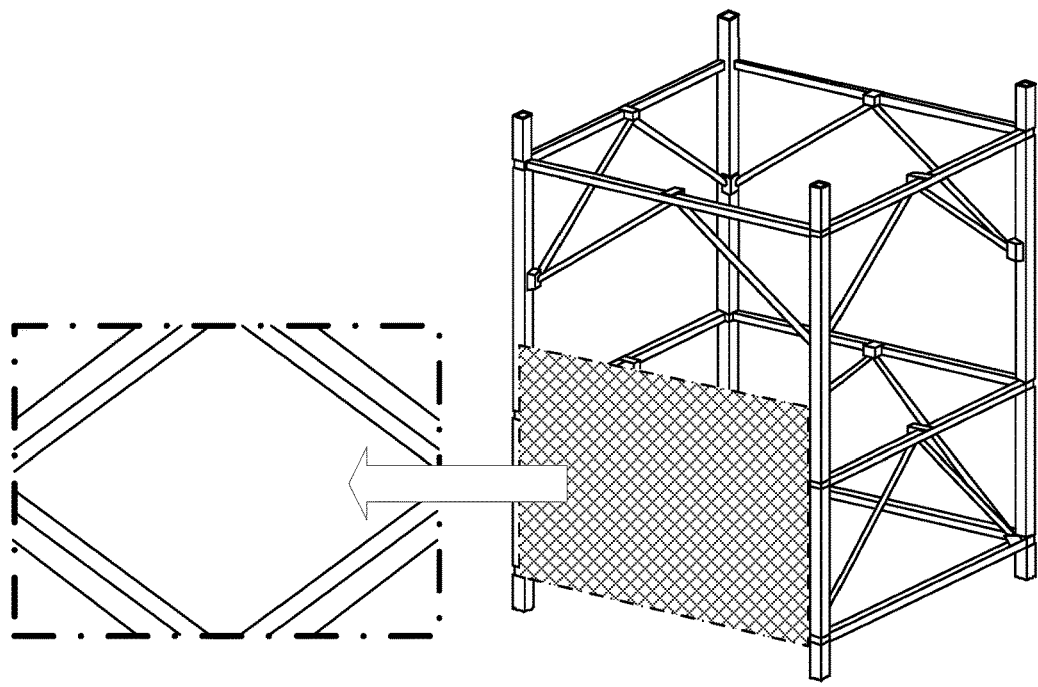
Figure 8:
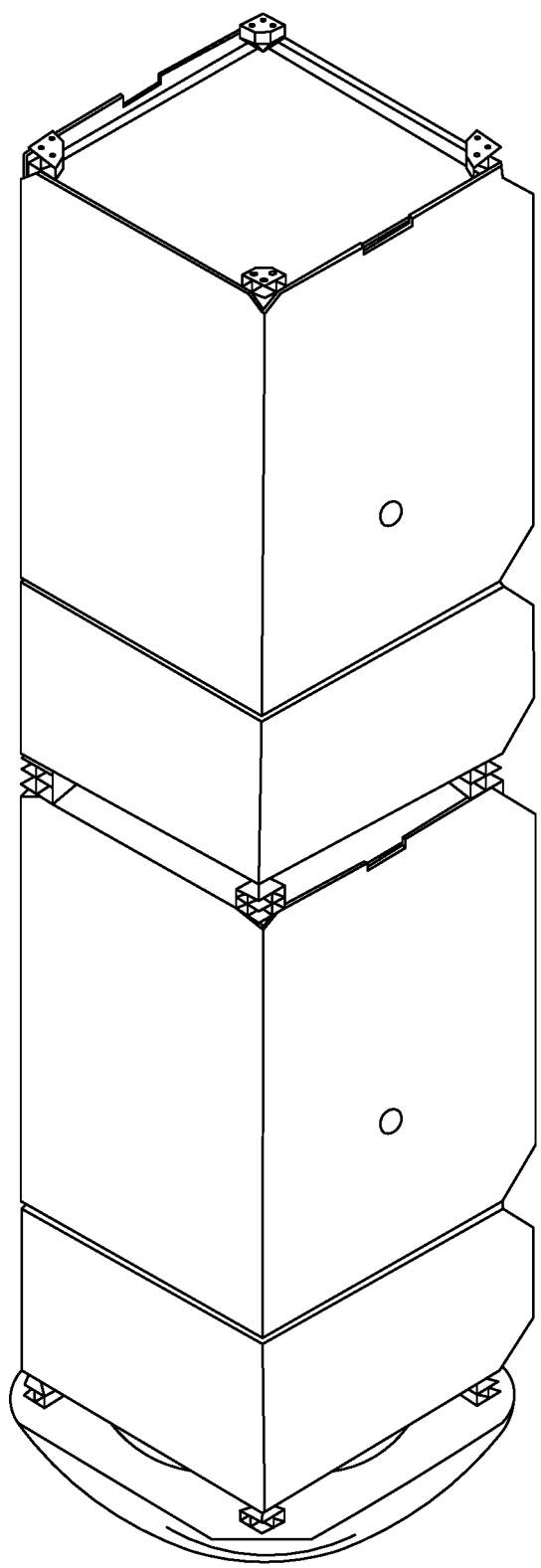
Figure 9:
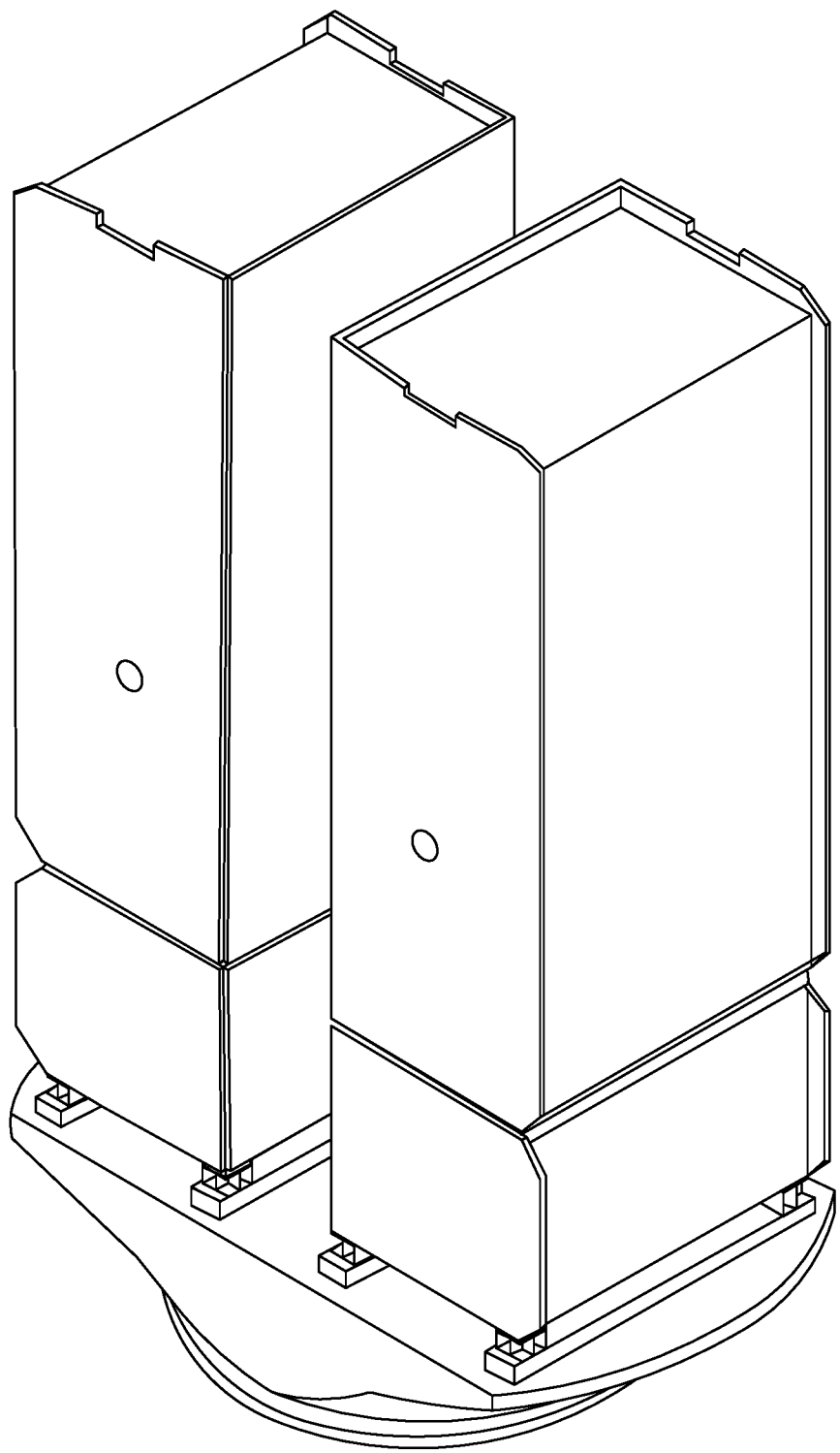
Figure 10:
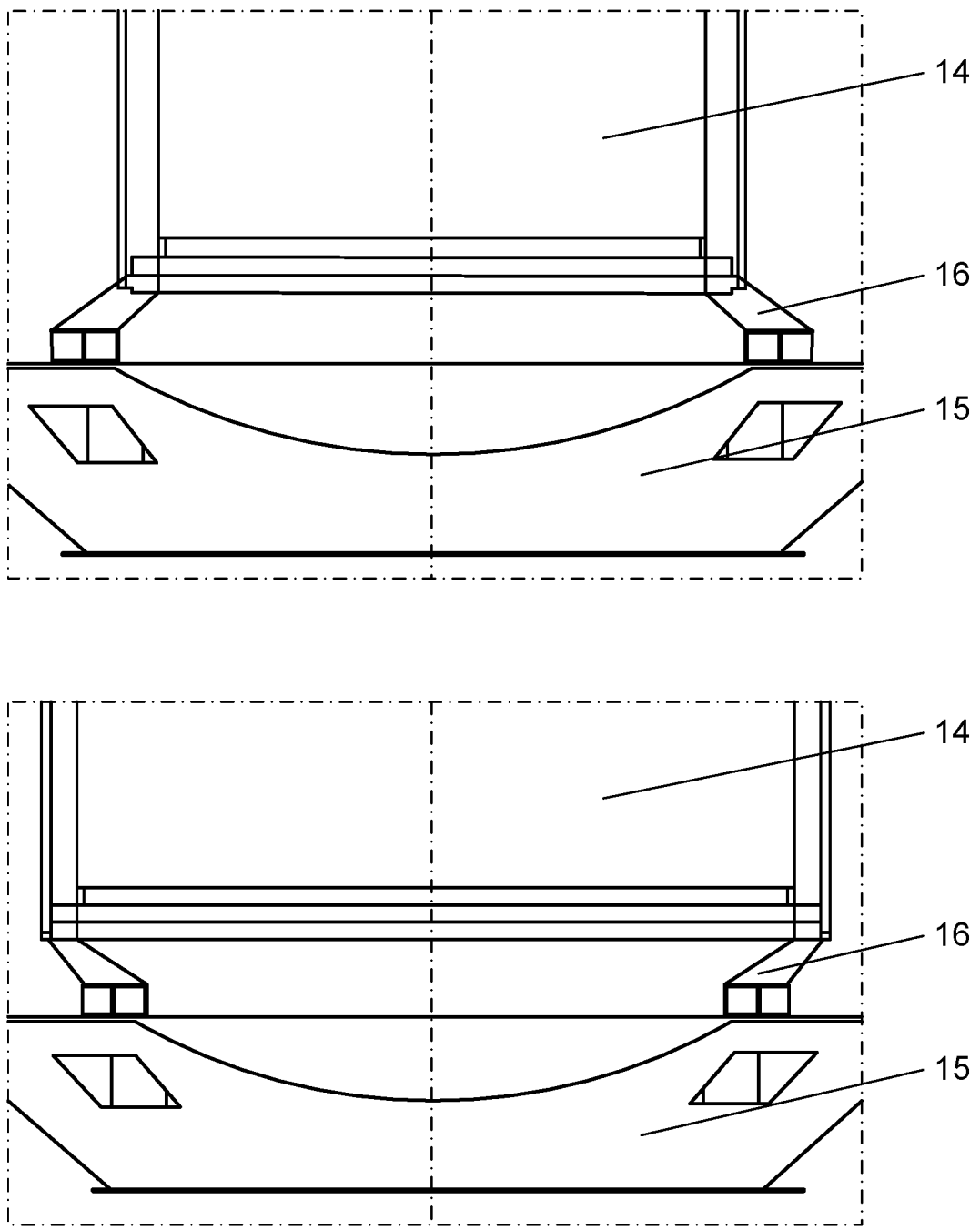
Figure 11:
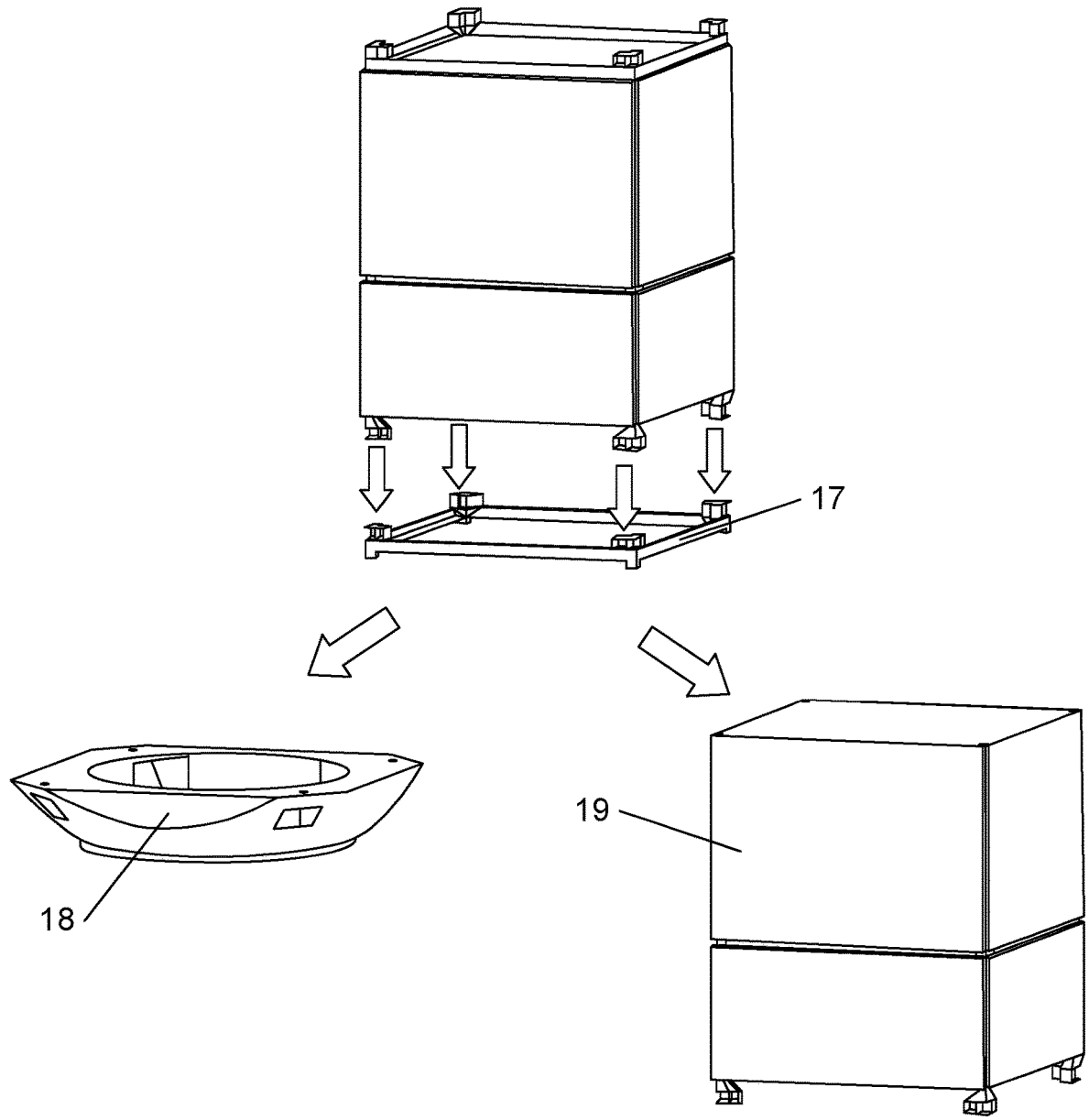

For a better understanding of the present invention, preferred embodiments, which are intended purely by way of non-limiting examples, will now be described with reference to the attached drawings (all not to scale), where:

FIG. 1 schematically illustrates a satellite structure concept and a Payload Attaching Fitting (PAF) according to a preferred, non-limiting embodiment of the present invention;

FIG. 2 schematically illustrates stacking of three satellites on a PAF (with a single-tower architecture) according to a preferred, non-limiting embodiment of the present invention;

FIG. 3 schematically illustrates four satellites on a PAF (with a side-by-side architecture) according to a preferred, non-limiting embodiment of the present invention;

FIG. 4 schematically illustrates a releasable cup-cone interface between two adjacent satellites or between the lower satellite and the PAF (with any architecture) according to a preferred, non-limiting embodiment of the present invention;

FIG. 5 schematically illustrates a variable number of electro-actuated separation devices that can be installed between adjacent satellites or between the lower satellite and the PAF (with any architecture) according to a preferred, non-limiting embodiment of the present invention;

FIG. 6 schematically illustrates a releasable electrical connector and spring driven pushers installed at selected cup-cone separation interface according to a preferred, non-limiting embodiment of the present invention;

FIG. 7 schematically illustrates a truss structure architecture concept according to a preferred, non-limiting embodiment of the present invention;

FIG. 8 schematically illustrates stacking of two satellites on a PAF (with single-tower architecture) according to a preferred, non-limiting embodiment of the present invention;

FIG. 9 schematically illustrates stacking of two satellites on a PAF (with side-by-side architecture) according to a preferred, non-limiting embodiment of the present invention;

FIG. 10 schematically illustrates a releasable interface between a generic satellite (having variable cross-section dimensions) and the same PAF according to non-limiting examples of the present invention; and FIG. 11 schematically illustrates the lower part of the separation system mounted on a frame that can be mounted and dismounted by means of a bolted interface on a PAF or on the lower satellite of the stack according to non-limiting examples of the present invention.

2. Theoretic Basis of the Invention

The concept of the present invention is based on the following considerations. From a structural mechanics point of view, the spacecraft can be simplified as a cantilever beam subject to inertial loads induced by the launcher. It is evident that the external satellite structures are more effective for bearing the launch loads due to their higher area moment of inertia opposed to central core structures (with cross-section dimension lower than external satellite structures cross-section dimension). The area moment of inertia is a key factor in structural stiffness and strength.

The typical external surfaces of a satellite are plane, to provide the simplest and most efficient support for internal electronic units and external thermal radiators. This implies the need to introduce a dedicated launcher interface that can provide the load transition mean from the corners among the plane surfaces and the launch vehicle bolted interface.

In summary, the present invention allows a more complete exploitation of the mass capability of the launch vehicle in conjunction with a dedicated launcher interface that is relatively light and compact and remains connected to the launch vehicle after satellite separation with Earth re-entry or graveyard disposal of itself.

3. Satellite Structural Concept

The satellite structural concept according to the present invention comprises an external load-bearing structure 9, typically with square or rectangular base (but also other shapes may be conveniently used).

With reference to FIG. 1, the structure 9 includes external vertical plane panels 1 connected by vertical beams 2. The external vertical plane panels 1 can be realized in any material typically used for satellite manufacturing (i.e., aluminum, aluminum sandwich, carbon fiber reinforced thermoplastic (CFRP) monocoque, CFRP sandwich, titanium, etc., or a combination thereof).

The vertical panels 1 are connected by means of four (or even more) corner beams 2. The corner beams 2 may have any cross-section (typically, square, rectangular or circular) and can be realized in any material typically used for satellite manufacturing. The corner beams 2 have releasable interfaces at their bottom and upper edges 8. Internal vertical shear panels 3 and horizontal platform panels 4 may also be used for structural or equipment accommodation convenience.

4. Bottom Transition Structure

Always with reference to FIG. 1, a bottom transition structure (or Payload Attaching Fitting—PAF) 5 completes the concept. In the upper part of the PAF 5, there are a discrete number of releasable interfaces 6 with each corner beam 2 of the satellite structure and in the lower part there is a bolted interface 7 with the upper stage of the launch vehicle (not shown in FIG. 1).

With reference to FIG. 10, various satellite cross-section dimensions 14 can be accommodated on the same PAF 15 with no need to redesign the latter. This is possible by changing the terminal angle of the vertical beams 16.

With reference to FIG. 11, in order to facilitate transport, interface fit check and separation testing of satellites, the lower part of the separation system is mounted on a frame 17 that can be mounted and dismounted by means of a bolted interface on the PAF 18, or on the lower satellite of the stack 19.

5. Stacking of the Satellites

The stacking of the satellites can be realized as a single tower as shown in FIG. 2, mounted on the relevant PAF, or as a double tower, i.e., two towers arranged side-by-side, as shown in FIG. 3, mounted on the relevant PAF 20 designed to accommodate the two towers of satellites. The assembly architecture depends on the available fairing volume and mass capacity of the selected launcher.

The releasable interfaces between stacked satellites and between the lower satellite(s) and the PAF are identical. These interfaces conveniently include:
- with reference to FIG. 4, mechanical interfaces including at least three cup-cone interfaces 10 connected at the edge of each corner beam 2;
- with reference to FIG. 6, electrical harness interfaces 21 to provide communication with the launch vehicle and the ground support equipment; the releasable interfaces being equipped with brackets for electrical connectors; micro-switches for satellite separation detection;
- again with reference to FIG. 6, systems 22 for ensuring spacecraft separation, typically spring driven separation pushers at selected separation interfaces to impart the necessary initial kinetic energy to the satellites after separation.

Again with reference to FIG. 4, the cup-cone interface 10 is capable to carry all local loads with exception of the axial traction load that is carried by the electro-actuated separation device(s) (e.g., NEA, Pyro-bolt, etc.).

With reference to FIG. 5, the lowest connection of the stacking (PAF-lower satellite) can use all the three (or more) separation devices 11. The upper connections 12 can use a lower number of separation devices due to the lower load levels.

The external planar panels 1 may incorporate the corner beams 2; this is foreseeable if additive manufacturing technologies are used.

With reference to FIG. 7, the basic structural concept is equivalent to the known Truss Structure architecture made just of vertical and diagonal beams. Nevertheless, satellite external structures cannot be open with diagonal beams 13 as they are planar to accommodate the electronic equipment, act as thermal radiators and provide a close envelope for radiation shielding. This means that the structural reinforcement function, exerted by the diagonal beams, is performed by the sandwich panels. These panels, for structural optimisation reasons, may conveniently include reinforcement embedded structures or skin thickness reinforcements 23.

6. Two Preferred, Non-Limiting Embodiments of the Invention

Two preferred, non-limiting embodiments of the inventions are:
1) with reference to FIG. 8, a single-tower architecture with the stacking of two identical satellites mounted on the dedicated PAF;
2) with reference to FIG. 9, a side-by-side architecture with two identical satellites mounted on the dedicated PAF.

7. Main Technical Advantages of the Invention with Respect to Similar Existing Concepts a) In principle, as explained in the paragraph 2 "Theoretic basis of the invention", the present invention is more efficient from a structural viewpoint with respect to the existing solutions (i.e., a certain stiffness performance level can be achieved with a lower structural mass).
b) The structural efficiency can be used in favor of an all-aluminum structure with higher performances concerning radiation shielding and cost reduction with respect to CFRP structures.
c) The internal volume of the satellite is fully available for equipment accommodation, whereas this is not the case of a satellite with a large and long internal structural tube.
d) The top and the bottom platforms of the satellite are completely available for equipment accommodation, whereas (again) this is not the case of a satellite with a large and long internal structural tube.
e) The complexity of the present invention is limited to the compact PAF structure and interfaces and not to the large and long internal structural tubes.
f) The cost of a limited number of pyros/NEA separation bolts is competitive with respect to the cost of two or more clamp-band systems.

g) The separable interface can be more robust at the base of the satellite stacking, where the mechanical loads are higher, and less robust for the other separable interfaces of the stacking.

In conclusion, it is worth noting that the present invention, which relates to a satellite structural concept with a mainly external load-carrying structure and its dedicated launcher interface, allows an efficient exploitation of the launch vehicle mass capability and satellite internal volume. This concept according to the present invention can be advantageously used for any space mission/orbit/launcher if deemed convenient.

The invention claimed is:

1. A system including a satellite structure and a dedicated Payload Attaching Fitting (PAF) for releasable attachment to said satellite structure, the satellite structure exclusively comprising an external load-carrying structure, said external load-carrying structure being configured to avail the entire internal volume of said satellite structure for equipment accommodation, wherein said external load-carrying structure includes external vertical planar panels having internal reinforcements or embedded structures or skin thickness reinforcements, each configured for exerting a structural reinforcement function of diagonal beams in a truss structure architecture, wherein the satellite structure has a discrete number of interfaces configured for attachment to said dedicated PAF; and wherein the dedicated PAF is mountable on a bolted interface of the upper stage of a launch vehicle, wherein the satellite structure has identical bottom and upper discrete number of interfaces configured to provide stacking of two or more satellites, and wherein each of said interface comprises:
   mechanical interfaces including a cup-cone interface connected at an edge of each corner beam;
   at least one releasable bolt;
   a system for spacecraft separation; and
   a releasable electrical connector.

2. The system according to claim 1, wherein interfaces between a satellite structure and the dedicated PAF, and/or between stacked satellite structures, are identical to each other and are each configured to be equipped with one or more electro-actuated separation devices according to local mechanical loads.

3. The system according to claim 1, wherein said external load-carrying structure further comprises vertical beams and corner beams.

4. The system according to claim 1, wherein the two or more satellites are identical.

5. The system according to claim 1, wherein the two or more satellites are with different masses and heights.

* * * * *